United States Patent
Akiba et al.

(10) Patent No.: US 11,463,591 B2
(45) Date of Patent: Oct. 4, 2022

(54) ELECTRONIC DEVICE, METHOD OF CONTROLLING ELECTRONIC DEVICE, AND NON-TRANSITORY COMPUTER-EXECUTABLE MEDIUM

(71) Applicants: Katsuya Akiba, Kanagawa (JP); Ryu Hasegawa, Kanagawa (JP)

(72) Inventors: Katsuya Akiba, Kanagawa (JP); Ryu Hasegawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/444,211

(22) Filed: Aug. 2, 2021

(65) Prior Publication Data
US 2022/0060588 A1    Feb. 24, 2022

(30) Foreign Application Priority Data
Aug. 20, 2020 (JP) .............................. JP2020-139511

(51) Int. Cl.
*H04N 1/00* (2006.01)
*G06F 1/3234* (2019.01)

(52) U.S. Cl.
CPC ....... *H04N 1/00029* (2013.01); *G06F 1/3234* (2013.01); *H04N 1/00896* (2013.01); *H04N 2201/0094* (2013.01)

(58) Field of Classification Search
CPC ........... H04N 1/00029; H04N 1/00896; H04N 2201/0094; G06F 1/3234

USPC ....................................................... 358/1.13
See application file for complete search history.

(56) References Cited

U.S. PATENT DOCUMENTS 10,642,544 B2 *  5/2020  Sugahara ............. G06K 15/027

FOREIGN PATENT DOCUMENTS

| JP | 6-314211 | 11/1994 |
|----|----------|---------|
| JP | 2014-119877 | 6/2014 |
| JP | 2016-062334 | 4/2016 |

OTHER PUBLICATIONS

JP-2016062334-A; Apr. 2016; Japan; Saito, H.*
JP-06314211-A; Apr. 1994; Japan; Tosaka, M.*

* cited by examiner

*Primary Examiner* — Neil R McLean
(74) *Attorney, Agent, or Firm* — IPUSA, PLLC

(57) ABSTRACT

An electronic device includes circuitry. The circuitry controls a state transition between an operation ready state and a low power state, the low power state being a state whose standby power is lower than standby power of the operation ready state. The circuitry calculates a predicted time period required for the electronic device to transit to the low power state. The circuitry selects, from a plurality of device diagnoses, a particular device diagnosis whose execution is completed within the calculated predicted time period. The circuitry executes the selected particular device diagnosis.

5 Claims, 10 Drawing Sheets

FIG. 4

| No | OPERATION MODE | DESCRIPTION |
|---|---|---|
| 1 | OFF MODE | STATE IN WHICH MAIN POWER SUPPLY OF DEVICE IS OFF |
| 2 | ON MODE | OPERATION READY STATE: STATE IN WHICH DEVICE IS NOT IN LOW POWER CONSUMPTION STATE (PREHEATING MODE OR ENERGY SAVING MODE), AND DEVICE IS READY FOR PERFORMING PRINTING, ETC., IN MINIMUM TRANSITION TIME<br><br>IN-OPERATION STATE: STATE IN WHICH DEVICE IS PERFORMING PRINTING PROCESSING, ETC. |
| 3 | PREHEATING MODE | STATE IN WHICH TRANSITION TIME REQUIRED FOR DEVICE TO TRANSIT TO IN-OPERATION STATE IS LONGER THAN TRANSITION TIME REQUIRED FOR DEVICE IN ON MODE TO TRANSIT TO IN-OPERATION STATE, AND STANDBY POWER IS LOWER THAN THAT OF ON MODE |
| 4 | ENERGY SAVING MODE | STATE IN WHICH TRANSITION TIME REQUIRED FOR DEVICE TO TRANSIT TO IN-OPERATION STATE IS LONGER THAN TRANSITION TIME REQUIRED FOR DEVICE IN PREHEATING MODE TO TRANSIT TO IN-OPERATION STATE, AND STANDBY POWER IS LOWER THAN THAT OF PREHEATING MODE |

FIG. 6

| No | CURRENT OPERATION MODE | THRESHOLD VALUE OF FIXING TEMPERATURE | NOTE (SPECIFIC EXAMPLE) |
|---|---|---|---|
| 1 | OPERATION MODE 1 | HIGHER THAN 120°C | OPERATION READY STATE |
| 2 | OPERATION MODE 2 | EQUAL TO OR LOWER THAN 120°C | PREHEATING MODE |
| 3 | OPERATION MODE 3 | EQUAL TO OR LOWER THAN 80°C | ENERGY SAVING MODE |

FIG. 9

| No | DEVICE DIAGNOSIS ID | DEVICE DIAGNOSIS NAME | EXECUTABLE OPERATION MODE | ESTIMATED DEVICE DIAGNOSIS TIME (SECONDS) | IMPORTANCE (HIGH – 5) | EXECUTION THRESHOLD VALUE | EXECUTION HISTORY (NUMBER OF TIMES) |
|---|---|---|---|---|---|---|---|
| 1 | 001 | CHARGER CLEANING | OPERATION MODE 1 | 25 | 1 | 10 | 5 |
| 2 | 002 | ADJUSTMENT OF SENSOR FOR TONER ADHESION AMOUNT | OPERATION MODE 2 | 5 | 1 | 8 | 2 |
| 3 | 003 | ACQUISITION OF INFORMATION INPUT TO SENSOR | OPERATION MODE 2 | 2 | 2 | 5 | 2 |
| .. | .. | .. | .. | .. | .. | .. | .. |
| n | 099 | ACQUISITION OF ERROR HISTORY | OPERATION MODE 3 | 2 | 5 | 2 | 10 |

ELECTRONIC DEVICE, METHOD OF CONTROLLING ELECTRONIC DEVICE, AND NON-TRANSITORY COMPUTER-EXECUTABLE MEDIUM

CROSS-REFERENCE TO RELATED APPLICATIONS

This patent application is based on and claims priority pursuant to 35 U.S.C. § 119(a) to Japanese Patent Application No. 2020-139511, filed on Aug. 20, 2020, in the Japan Patent Office, the entire disclosure of which is hereby incorporated by reference herein.

BACKGROUND

Technical Field

Embodiments of the present disclosure relate to an electronic device, a method of controlling electronic device, and a non-transitory computer-executable medium.

Related Art

Energy efficiency such as power saving of an image forming apparatus such as a copying machine is drawing attention in these days. In view of such trend, an image forming apparatus having an energy saving mode for reducing power consumption as much as possible is known.

SUMMARY

According to an embodiment, an electronic device includes circuitry configured to: control a state transition between an operation ready state and a low power state, the low power state being a state whose standby power is lower than standby power of the operation ready state; calculate a predicted time period required for the electronic device to transit to the low power state; select, from a plurality of device diagnoses, a particular device diagnosis whose execution is completed within the calculated predicted time period; and execute the selected particular device diagnosis.

According to an embodiment, a method of controlling an electronic device includes: controlling a state transition between an operation ready state and a low power state, the low power state being a state whose standby power is lower than standby power of the operation ready state; calculating a predicted time period required for the electronic device to transit to the low power state; selecting, from a plurality of device diagnoses, a particular device diagnosis whose execution is completed within the calculated predicted time period; and executing the selected particular device diagnosis.

According to an embodiment, a non-transitory computer-executable medium storing a program storing instructions, which, when executed by the one or more processors, cause the one or more processors to perform a method of controlling an electronic device is provided. The method includes: controlling a state transition between an operation ready state and a low power state, the low power state being a state whose standby power is lower than standby power of the operation ready state; calculating a predicted time period required for the electronic device to transit to the low power state; selecting, from a plurality of device diagnoses, a particular device diagnosis whose execution is completed within the calculated predicted time period; and executing the selected particular device diagnosis.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4 is a diagram for describing operation modes of the MFP, according to according to an embodiment of the present disclosure;

FIG. 6 is an example of a table associating an operation mode and a fixing temperature threshold value with each other, according to according to an embodiment of the present disclosure;

FIG. 9 is a data table of an example of device diagnosis information, according to according to an embodiment of the present disclosure.

Figure 1:
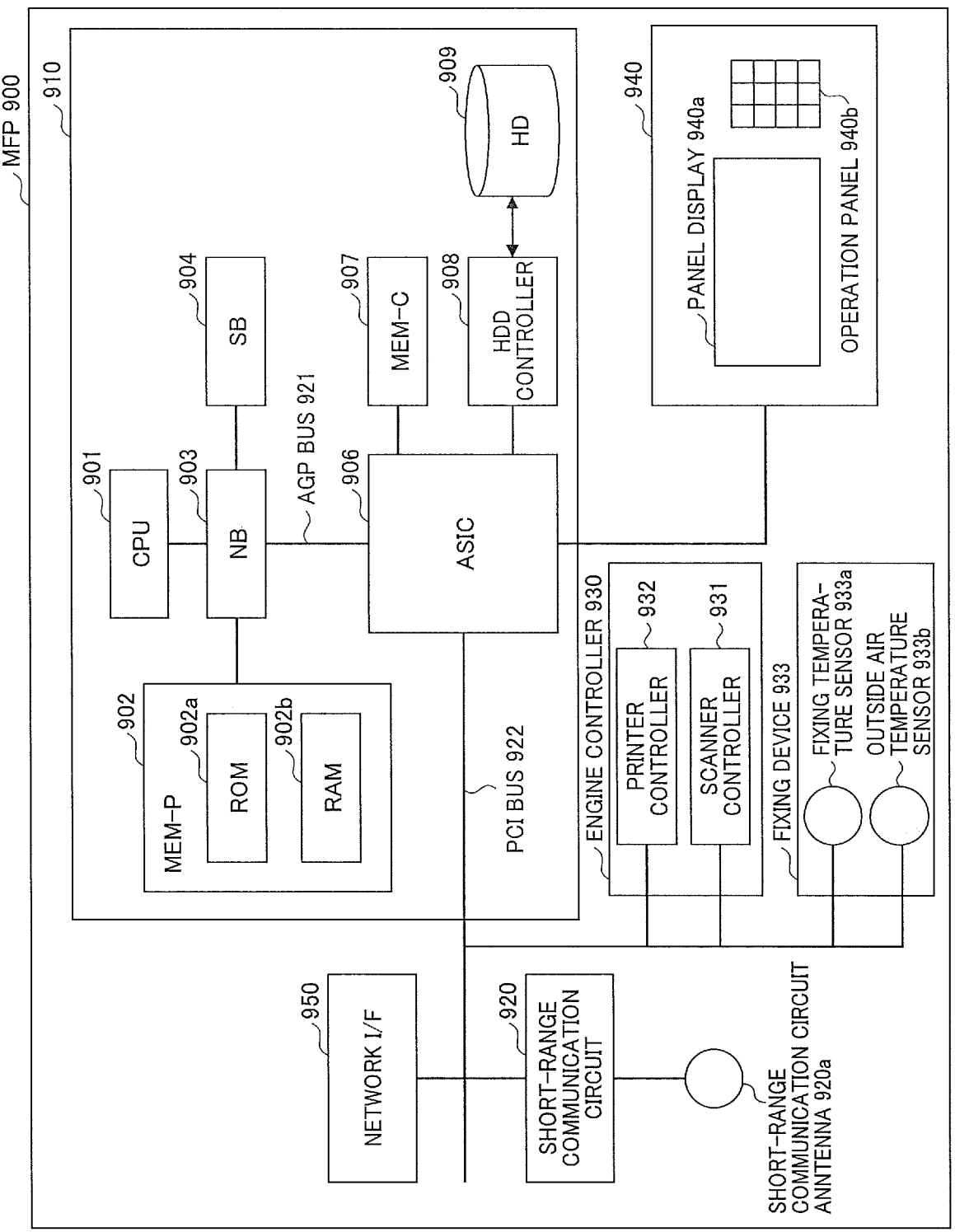
FIG. 1 is a block diagram illustrating an example of a hardware configuration of a multifunction peripheral/product/printer (MFP), according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings. In the present embodiment, a description is given of an example in which a multifunction peripheral/product/printer (MFP) is an example of an electronic device having an energy saving mode and a device diagnosis capability. The MFP is an example of an image forming apparatus.

Hardware Configuration:

An MFP 900, which is an example of an electronic device having an energy saving mode and a device diagnosis capability has a hardware configuration as illustrated in FIG. 1, for example. FIG. 1 is a block diagram illustrating an example of a hardware configuration of the MFP 900, according to the present embodiment.

The MFP 900 of FIG. 1 includes a controller 910, a short-range communication circuit 920, an engine controller 930, a control panel 940, and a network interface (I/F) 950. The controller 910 includes a central processing unit (CPU) 901 as a main processor of a computer, a system memory (MEM-P) 902, a north bridge (NB) 903, a south bridge (SB) 904, an application specific integrated circuit (ASIC) 906, a local memory (MEM-C) 907 as a storage unit, a hard disk drive (HDD) controller 908, and a hard disk (HD) 909 as a storage unit. The NB 903 and the ASIC 906 are connected through an accelerated graphics port (AGP) bus 921.

The CPU 901 is a processor that controls overall operation of the MFP 900. The NB 903 is a bridge that connects the CPU 901, to the MEM-P 902, the SB 904, and the AGP bus 921. The NB 903 includes a memory controller that controls reading and writing from and to the MEM-P 902, a peripheral component interconnect (PCI) master, and an AGP target.

The MEM-P 902 includes a read only memory (ROM) 902a as a memory that stores program and data for implementing various functions of the controller 910. The MEM-P 902 further includes a random access memory (RAM) 902b as a memory that deploys the program and data, or as a drawing memory that stores drawing data for printing. The program stored in the ROM 902a may be stored in any computer-readable storage medium, such as a compact disc-read only memory (CD-ROM), compact disc-recordable (CD-R), or digital versatile disc (DVD), in a file format installable or executable by a computer, for distribution.

The SB 904 is a bridge that connects the NB 903 with a PCI device or a peripheral device. The ASIC 906 is an integrated circuit (IC) dedicated to an image processing use, and connects the AGP bus 921, a PCI bus 922, the HDD controller 908, and the MEM-C 907.

The ASIC 906 includes a PCI target, an AGP master, an arbiter (ARB) as a central processor of the ASIC 906, a memory controller to control the MEM-C 907, a plurality of direct memory access controllers (DMACs), and a PCI unit. The DMACs is capable of converting coordinates of image data with a hardware logic. The PCI unit transfers data between a scanner controller 931 and a printer controller 932 through the PCI bus 922. The ASIC 906 may be connected to a universal serial bus (USB) interface, or the Institute of Electrical and Electronics Engineers 1394 (IEEE1394) interface.

The MEM-C 907 is a local memory used as a buffer for image data to be copied or coding. The HD 909 stores various image data, font data for printing, and form data. The HDD controller 908 reads or writes various data from or to the HD 909 under control of the CPU 901. The AGP bus 921 is a bus interface for a graphics accelerator card, which has been proposed to accelerate graphics processing. Through directly accessing the MEM-P 902 by high-throughput, speed of the graphics accelerator card is improved.

The short-range communication circuit 920 includes a short-range communication antenna 920a. The short-range communication circuit 920 is a communication circuit that communicates in compliance with the near field communication (NFC) or the Bluetooth (registered trademark), for example.

The engine controller 930 includes the scanner controller 931 and the printer controller 932. The printer controller 932 controls a fixing device 933 that includes a fixing temperature sensor 932a and an outside air temperature sensor 932b. The control panel 940 includes a panel display 940a and an operation panel 940b. The panel display 940a is, e.g., a touch panel that displays current settings or a selection screen and that receives a user input. The operation panel 940b includes a numeric keypad and a start key. The numeric keypad receives set values of various image forming parameters such as an image density parameter. The start key receives an instruction to start copying.

The controller 910 controls overall operation of the MFP 900. For example, the controller 910 controls drawing, communication, or user inputs to the control panel 940. The scanner controller 931 and the printer controller 932 each performs various image processing, such as error diffusion or gamma conversion.

In response to an instruction to select a specific application through the control panel 940, for example, using a mode switch key, the MFP 900 selectively performs a document box function, a copier function, a printer function, and a facsimile function. In response to selection of the document box function, the MFP 900 operates in a document box mode to store document data. In response to selection of the copier function, the MFP 900 operates in a copier mode. In response to selection of the printer function, the MFP 900 operates in a printer mode. In response to selection of the facsimile function, the MFP 900 operates in a facsimile mode.

The network I/F 950 is an interface that enables the MFP 900 to perform data communication through a network. The short-range communication circuit 920 and the network I/F 950 are electrically connected to the ASIC 906 through the PCI bus 922.

When an IC card is used for authentication of a user to use the MFP 900, the MFP 900 includes a built-in IC card reader. Alternatively, the IC card reader is attached as an external device to the MFP 900. The MFP 900 reads identification information unique to the IC card from a radio frequency (RF) tag embedded in the IC card by wireless communication. In another example, the IC card is included in a smart device such as a smartphone. In still another example, the MFP 900 uses any suitable device other than the IC card reader, such as a biometric authentication device (fingerprint, palm print, iris, face, etc.) or a barcode reading device, for example.

Figure 2:
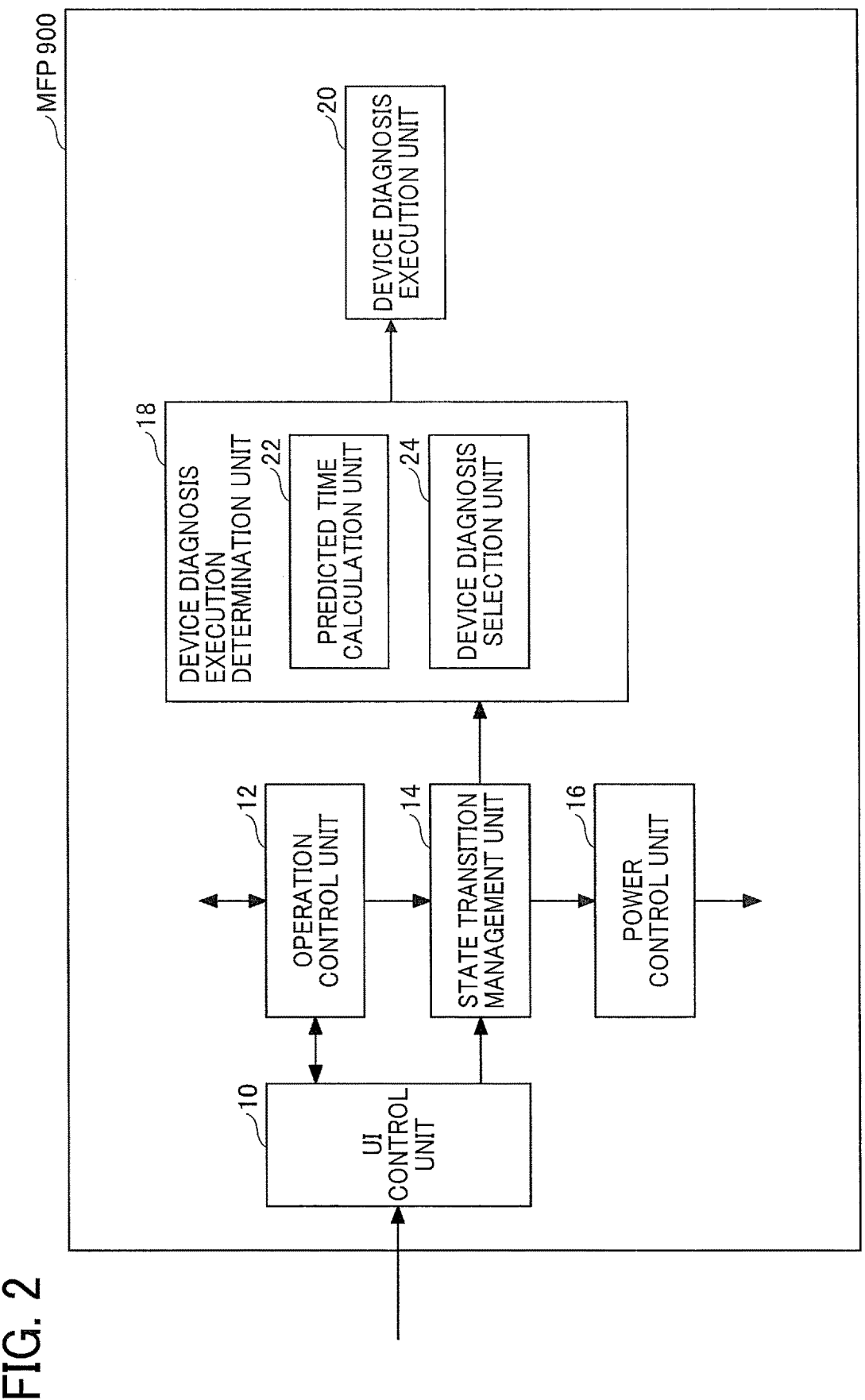
FIG. 2 is a block diagram illustrating an example of a functional configuration of the MFP, according to an embodiment of the present disclosure.

Functional Configuration:

The MFP 900 according to the present embodiment is implemented by, for example, a functional configuration as illustrated in FIG. 2. FIG. 2 is a block diagram illustrating an example of a functional configuration of the MFP 900, according to the present embodiment. The functional configuration of FIG. 2 omits components unnecessary for the description of the present embodiment as appropriate.

The MFP 900 of FIG. 2 includes a user interface (UI) control unit 10, an operation control unit 12, a state transition management unit 14, a power control unit 16, a device diagnosis execution determination unit 18, and a device diagnosis execution unit 20. The MFP 900 implements the functional configuration as illustrated in FIG. 2 by executing a program.

The UI control unit 10 controls a UI that allows an operator to interact with the MFP 900, to control display of the control panel 940 and control input reception from the operator, for example. For example, the controlling input reception from the operator includes receiving an operation by the operator to a main power supply, the touch panel, the numeric keypad, and the start key. The UI control unit 10 sends a notification indicating an occurrence of various events such as turning on of the main power supply to the state transition management unit 14.

The operation control unit 12 controls processing of various functions such as printing, scanning, and copying that the MFP 900 provides to the operator. For example, the operation control unit 12 controls processing of the copier function in accordance with an instruction that is input by the operator and received by the UI control unit 10. In another example, the operation control unit 12 receives an instruction input by the operator from, for example, a personal computer (PC) that is communicable with the MFP 900 through a network, and controls processing of functions such as printing in accordance with the received instruction input by the operator. The operation control unit 12 sends a notification indicating an occurrence of various events such as a completion of printing to the state transition management unit 14.

Figure 3:
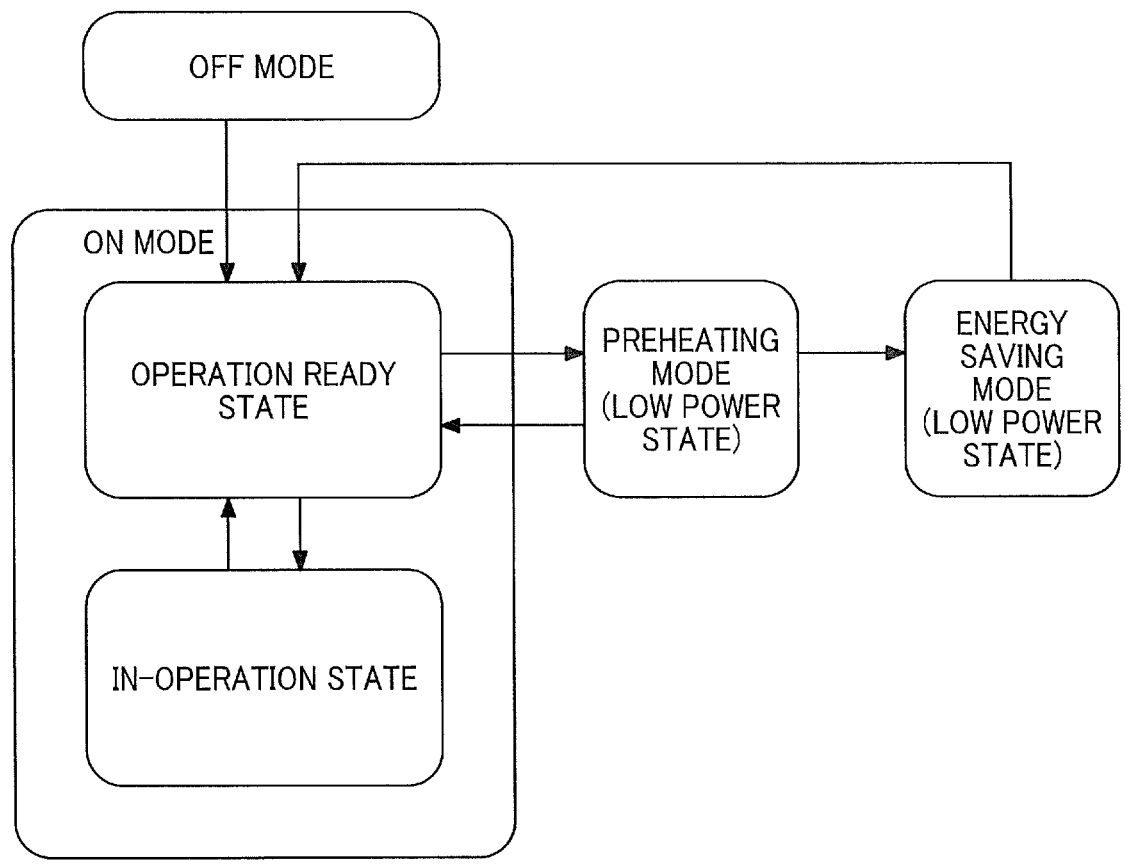
FIG. 3 is a diagram illustrating an example of a transition between operation modes of the MFP, according to an embodiment of the present disclosure.

The state transition management unit 14 manages the transition of a state (operation mode) for energy saving, for example, as illustrated in FIG. 3 and FIG. 4. FIG. 3 is a diagram illustrating an example of a transition between operation modes of the MFP 900, according to the present embodiment. FIG. 4 is a diagram for describing the operation modes of the MFP 900, according to the present embodiment.

A description given with reference to FIG. 3 and FIG. 4 is of an example in which the MFP 900 has an off mode, an on mode, a preheating mode, and an energy saving mode as operation modes. The off mode is a state in which the main power supply of the MFP 900 is off. The on mode is a state in which the MFP 900 does not transition to a low power state such as the preheating mode or the energy saving mode. The on mode includes an in-operation state and an operation ready state.

The in-operation state is a state in which the MFP 900 performs processing of functions such as printing function. The operation ready state is a state in which the MFP 900 can perform processing such as printing in a minimum transition time, which is shorter than the transit time required for the MFP 900 to transit from the preheating mode or the energy saving mode. The preheating mode is a state in which the transition time to the in-operation state is longer than the transition time from the operation ready state to the in-operation state, and a standby power is lower than that of the operation ready state. The energy saving mode is a state in which the transition time to the in-operation state is longer than the transition time from the preheating mode to the in-operation state and the standby power is lower than that of the preheating mode.

When the main power supply is switched from off to on, the MFP 900 transitions from the off mode to the operation ready state of the on mode. The MFP 900 in the operation ready state transitions to the in-operation state operation state in response to an occurrence of an event for activating a function such as a print start. The MFP 900 in the in-operation state transitions to the operation ready state in response to an occurrence of an event for of ending the operation of the function such as a print end.

The MFP 900 in the operation ready state transitions to the preheating mode when a transition condition to the preheating mode is satisfied. Examples of the transition condition to the preheating mode include, but are not limited to, a decrease of a fixing temperature (e.g., a temperature of a surface of a fixing roller of a fixing device) to a fixing temperature threshold value described below, elapse of a predetermined time period in a state in which there is no operation from the operator, or reception of an instruction input by the operator for causing the MFP 900 to transition to the preheating mode. The decrease of the fixing temperature to the fixing temperature threshold value is the condition for the transition to the preheating mode, since the fixing temperature is required to be lowered to a predetermined temperature before turning off a power source of a fan of the MFP 900, for example. The MFP 900 in the preheating mode transitions to the on mode in response to an occurrence of an event for causing the MFP 900 to transition to the on mode.

The MFP 900 in the preheating mode transitions to the energy saving mode when a transition condition to the energy saving mode is satisfied. Examples of the transition condition to the energy saving mode include, but are not limited to, a decrease of the fixing temperature to the fixing temperature threshold value described below, elapse of a predetermined time period in a state in which there is no operation from the operator, or reception of an instruction input by the operator for causing the MFP 900 to transition to the energy saving mode. The MFP 900 in the energy saving mode transitions to the on mode in response to an occurrence of an event for causing the MFP 900 to transition to the on mode.

Note that the operation modes described with reference to FIG. 3 and FIG. 4 are just examples, and each operation mode may have a different name. Although in the description given above with reference to FIG. 3 and FIG. 4 is of an example in which the number of the low power states to which the MFP 900 transitions from the on mode is two, i.e., the preheating mode and the energy saving mode, in another example, the number may be one or three or more.

Referring again to FIG. 2, the power control unit 16 controls the power supplied to each device of the MFP 900 based on the transition of the operation mode managed by the state transition management unit 14, to implement the operation modes as illustrated in FIG. 3 and FIG. 4.

The device diagnosis execution determination unit 18 determines whether to execute a device diagnosis at the time of transition from the in-operation state to the operation ready state illustrated in FIG. 3 and FIG. 4. Although in the present embodiment, the following description is given of an example in which the determination whether to execute a device diagnosis is performed at the time of the transition from the in-operation state to the operation ready state, in another example, the determination whether to execute the device diagnosis may be performed at the time when the MFP 900 transitions to the operation ready state after warm-up of the MFP 900 is completed.

The device diagnosis execution determination unit 18 includes a predicted time calculation unit 22 and a device diagnosis selection unit 24. The predicted time calculation unit 22 calculates a predicted time period of the transition (shift) from the operation ready state to the low power state such as the preheating mode or the energy saving mode. In another example, the predicted time calculation unit 22 calculates a predicted time period of the transition from the preheating mode to the energy saving mode.

The device diagnosis selection unit 24 selects a particular device diagnosis whose execution can be completed within the predicted time period calculated by the predicted time calculation unit 22 based on an estimated device diagnosis time period estimated for each device diagnosis. In other words, the device diagnosis selection unit 24 selects a device diagnosis that is executable within the calculated predicted time period. Note that there is a case in which, for each device diagnosis, an operation mode in which the corresponding device diagnosis can be executed (executable operation mode) is set in advance. In this case, the device diagnosis selection unit 24 may select the particular device diagnosis in consideration of the executable operation mode.

The device diagnosis execution unit 20 executes the particular device diagnosis according to the result of the execution determination of the device diagnosis performed by the device diagnosis execution determination unit 18. As described, the MFP 900 according to the present embodiment calculates the predicted time period of the transition from the operation ready state to the energy saving mode and selects and executes the particular device diagnosis that is predicted to be completed during the predicted time period. This enables the MFP 900 according to the present embodiment to reduce the possibility that the transition to the energy saving mode occurs during the execution of the device diagnosis and reduce the interruption of processing of the device diagnosis being executed.

Figure 5:
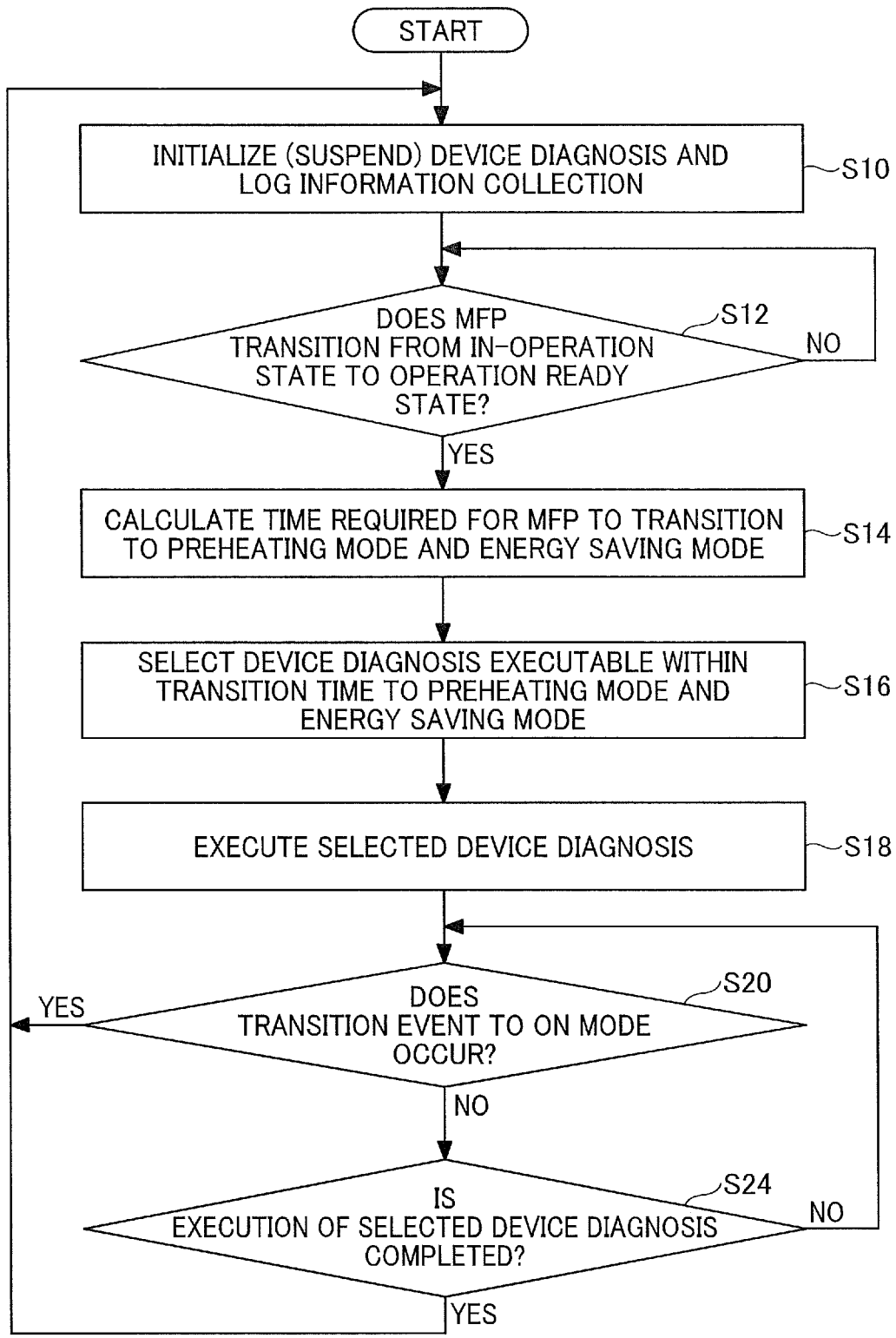
FIG. 5 is a flowchart illustrating an example of an operation relating to device diagnosis, according to according to an embodiment of the present disclosure.

Operation:

FIG. 5 is a flowchart illustrating an example of an operation relating to device diagnosis, according to the present embodiment. In step S10, the MFP 900 initializes device diagnosis and log information collection. In response to occurrence of the transition from the in-operation state to the operation ready state described above with reference to FIG. 3 and FIG. 4 (step S12: Yes), the MFP 900 performs processes step S14 and subsequent steps.

In step S14, the predicted time calculation unit 22 of the MFP 900 calculates a predicted time period required for the MFP 900 to transition from the operation ready state to the preheating mode and the energy saving mode. The predicted time calculation unit 22 calculates the predicted time period of the transition from the operation ready state to the preheating mode and the energy saving mode in various ways. For example, the predicted time calculation unit 22 predicts the predicted time period using a table of FIG. 6.

FIG. 6 is an example of a table associating the operation mode and the fixing temperature threshold value with each other. The fixing temperature threshold value is an example of the transition condition from the current operation mode to the next operation mode. In the table of FIG. 6, the fixing temperature threshold value is set for each operation mode.

For example, the table of FIG. 6 indicates the transition condition for the transition from an "operation mode 1" to an "operation mode 3" is that the fixing temperature changes from "higher than 120° C." to "equal to or lower than 80° C.". Under the setting of the transition condition as indicated in the table of FIG. 6, the MFP 900 transitions from the "operation mode 1" to the "operation mode 3" when the fixing temperature gets equal to or lower than 80° C.".

Figure 7:
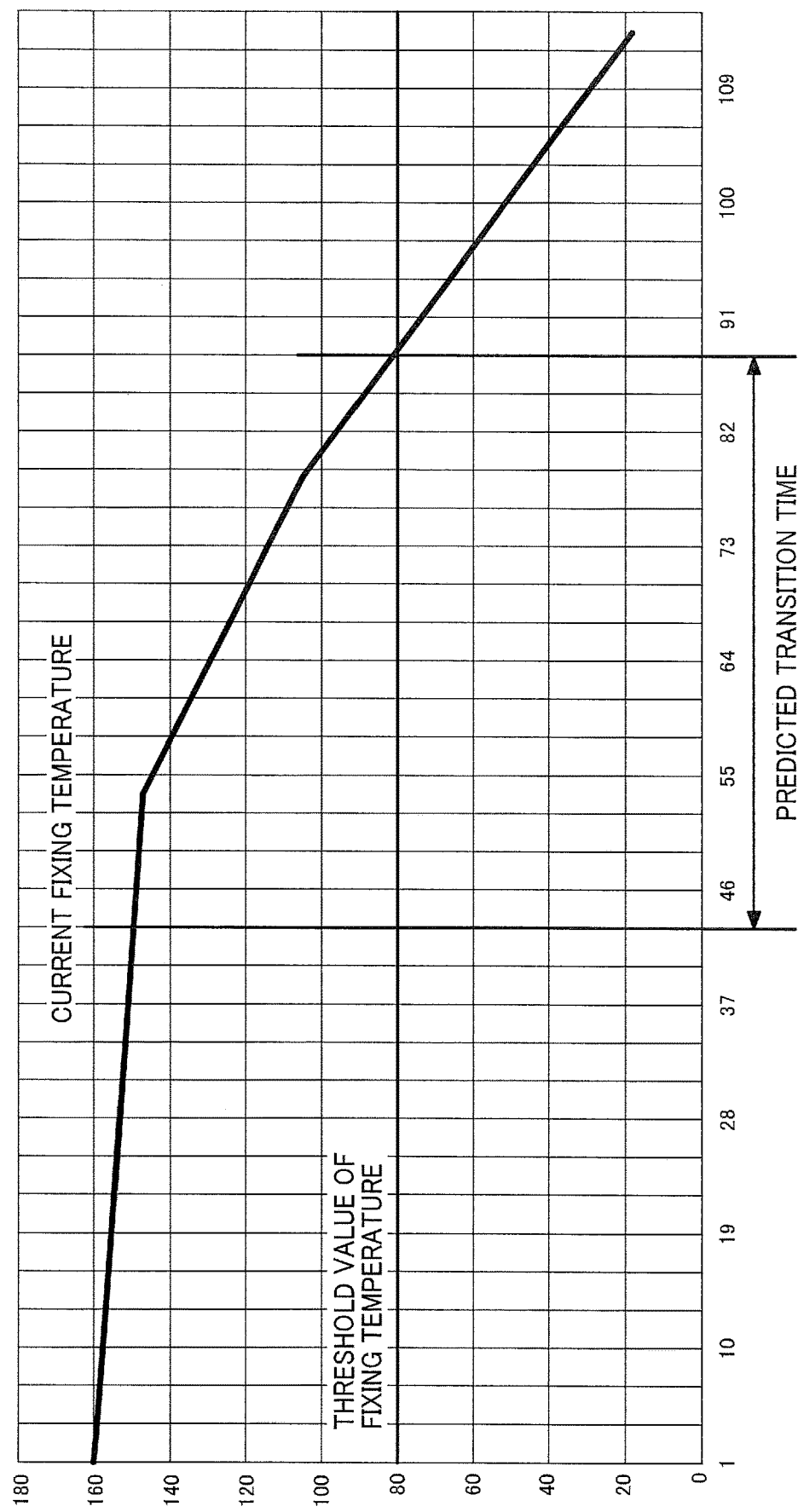
FIG. 7 is a graph illustrating an example of a change in a fixing temperature over time, according to according to an embodiment of the present disclosure.

The predicted time calculation unit 22 calculates the predicted time period of the transition of the operation mode using the current fixing temperature, the fixing temperature threshold value indicated in FIG. 6, and a graph of the fixing temperature obtained by experiment as illustrated in FIG. 7.

FIG. 7 is a graph illustrating an example of a change in fixing temperature over time. For example, in the example of the graph of FIG. 7, when the current fixing temperature is 150° C. and the fixing temperature threshold is 80° C., the predicted time period required for the current fixing temperature to reach to the fixing temperature threshold value is about 45 seconds. The fixing temperature of the MFP 900 changes depending on outside air temperature.

The predicted time calculation unit 22 corrects the slope of the graph of FIG. 7 to a less steep one when the outside air temperature is high or in a season such as summer, and corrects the slope of the graph of FIG. 7 to a steeper one when the outside air temperature is low or in a season such as winter, to calculate a more accurate predicted time period.

Referring again to FIG. 5, in step S16, the device diagnosis selection unit 24 selects a device diagnosis that can be completed (executable) within the predicted time period calculated by the predicted time calculation unit 22, based on an estimated device diagnosis time estimated for each device diagnosis, as described below.

In step S18, the device diagnosis execution unit 20 executes the device diagnosis according to the result of the device diagnosis execution determination performed by the device diagnosis execution determination unit 18. The MFP 900 repeats the processes of steps S20 and S24 until no event of transition to the on mode occurs (No in step S20) or execution of the device diagnosis selected in step S16 ends (Yes in step S24).

Figure 8:
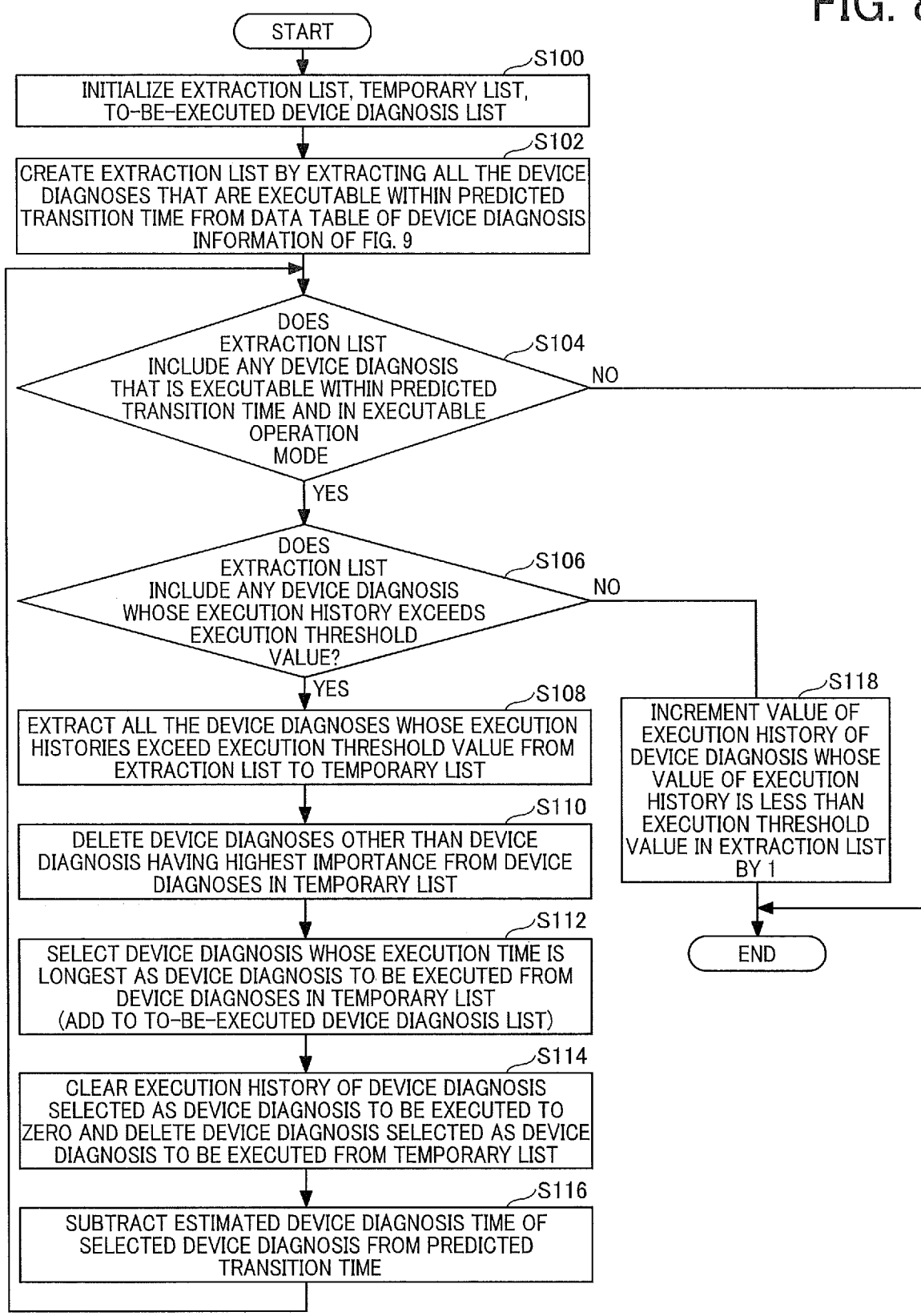
FIG. 8 is a flowchart illustrating an example of an operation of selecting a particular device diagnosis that can be completed within a predicted time period, according to according to an embodiment of the present disclosure.
Figure 10:
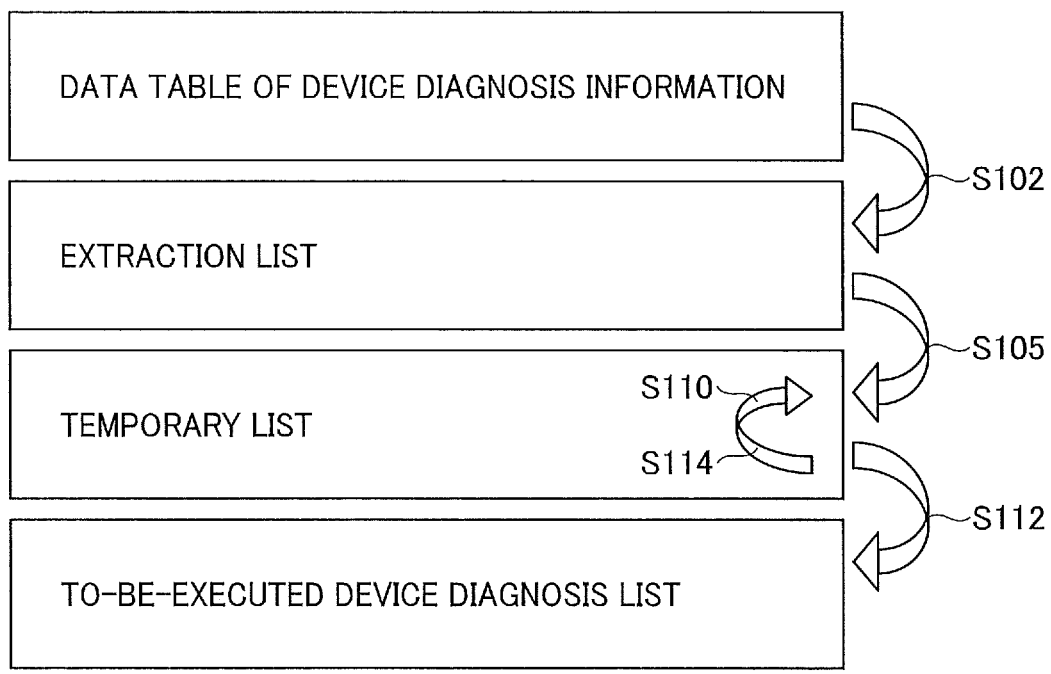
FIG. 10 illustrates an example of an area used for selecting a device diagnosis, according to according to an embodiment of the present disclosure.

A detailed description is now given of the process of step S16. FIG. 8 is a flowchart illustrating an example of an operation of selecting a particular device diagnosis that can be completed within the predicted time period. FIG. 9 is a data table of an example of device diagnosis information. FIG. 10 illustrates an example of an area used for selecting the particular device diagnosis.

In step S100, the device diagnosis selection unit 24 initializes an extraction list, a temporary list, and to-be-executed device diagnosis list illustrated in FIG. 10. In step S102, the device diagnosis selection unit 24 extracts all device diagnoses that can be completed within the predicted time period from the data table of the device diagnosis information of FIG. 9, to create the extraction list.

The data table of the device diagnosis information of FIG. 9 associates, for each device diagnosis identified by a device diagnosis identifier (ID) and a device diagnosis name, an executable operation mode, an estimated device diagnosis time, importance, an execution threshold value, and an execution history with each other.

The executable operation mode is an operation mode in which the corresponding device diagnosis is executed. The estimated device diagnosis time is an estimated time period from a start of the execution of the corresponding device diagnosis to a completion of the execution of the corresponding device diagnosis. The importance indicates a degree of importance of the corresponding device diagnosis. The execution history is a value that is incremented each time the corresponding device diagnosis is extracted to the extraction list in the process of step S16, and that is cleared to zero when the corresponding device diagnosis is performed. The execution threshold value is a value indicating execution frequency of the corresponding device diagnosis. In the example of the data table of the device diagnosis information in FIG. 9, the device diagnosis whose execution history reaches the execution threshold value is executed.

In step S104, the device diagnosis selection unit 24 determines whether the device diagnoses extracted to the extraction list in step S102 include any device diagnosis whose estimated device diagnosis time is within the predicted time period and that is in the executable operation mode. When the device diagnoses extracted to the extraction list in step S102 include any device diagnosis whose estimated device diagnosis time is within the predicted time period and that is in the executable operation mode, the operation proceeds to step S106.

In step S106, in order to reduce the frequency of executing the same device diagnosis, the device diagnosis selection unit 24 further determines whether there is any device diagnosis whose execution history is equal to or greater than the execution threshold value. When the device diagnosis selection unit 24 determines that there is any device diagnosis whose execution history is equal to or greater than the execution threshold value, the operation proceeds to step S108 and the device diagnosis selection unit 24 selects a particular device diagnosis to be executed.

More specifically, in step S108, the device diagnosis selection unit 24 extracts, based on the determination in step S106, all device diagnoses whose execution history is equal to or greater than the execution threshold value, to the temporary list. In step S110, the device diagnosis selection unit 24 deletes device diagnoses other than a device diagnosis having the highest importance from the device diagnoses extracted in the temporary list. In other words, the device diagnosis selection unit 24 re-extracts the device diagnosis having the highest importance from the device diagnoses extracted in the temporary list.

In step S112, the device diagnosis selection unit 24 selects a particular device diagnosis whose estimated device diagnosis time is longest from the device diagnoses in the temporary list as a device diagnosis to be executed and adds the selected particular device diagnosis to the to-be-executed device diagnosis list. Thus, the to-be-executed device diagnosis list includes the particular device diagnosis to be executed, which is finally selected from the temporary list.

In step S114, the device diagnosis selection unit 24 clears the execution history of the particular device diagnosis selected as the device diagnosis to be executed to zero, and deletes the particular device diagnosis selected as the device diagnosis to be executed from the temporary list. In step S116, the device diagnosis selection unit 24 subtracts the estimated device diagnosis time of the device diagnosis to be executed from the predicted time period in order to re-determine another particular device diagnosis that can be executed after completion of the device diagnosis added to the to-be-executed device diagnosis list.

Then, the operation returns step S104, and the device diagnosis selection unit 24 re-determines another particular device diagnosis that can be continuously executed after the completion of the device diagnosis added to the to-be-executed device diagnosis list. Note that when the device diagnosis selection unit 24 determines that there is no device diagnosis whose execution history is equal to or greater than the execution threshold value in step S106, the device diagnosis selection unit 24 increments the execution history of the device diagnosis whose execution history is less than the execution threshold value by one from among the device diagnoses extracted in the extraction list, and ends the operation of FIG. 8 (S118). In addition, when the device diagnosis selection unit 24 determines, in step S104, that the device diagnoses extracted to the extraction list in step S102 include no device diagnosis whose estimated device diagnosis time is within the predicted time period and that is in the executable operation mode, the device diagnosis selection unit 24 ends the operation of FIG. 8.

As described above, the MFP 900 according to the present embodiment selects the particular device diagnosis to be executed within the time period until the MFP 900 transitions to the energy saving mode based on the estimated device diagnosis time, the executable operation mode, the importance, the execution threshold value, and the execution history, whereby reducing interruption of device diagnosis processing.

Note that the process of reducing the execution frequency of the same device diagnosis described above with reference to FIG. 8 is merely an example, and other suitable processing may be performed in the process. In another example, the execution history is cleared to zero in response to turning on of the main power supply, a reset of the MFP 900, a passage of time, a replace of a device, or manual operation by a user, for example.

In the related art, some of electronic devices such as image forming apparatuses have a device diagnosis function. Further, some of electronic devices having the device diagnosis function have an energy saving mode. Furthermore, some of device diagnosing processing performed by the electronic devices are interrupted unless the diagnosing processing is completed before the electronic devices transition to the energy saving mode.

Such interruption of the electronic device diagnosis processing due to the transition to the energy saving mode causes waste.

According to one or more embodiments of the present disclosure, the interruption of device diagnosis processing of an electronic device is reduced.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. An electronic device comprising circuitry configured to:
control a state transition between an operation ready state and a low power state, the low power state being a state whose standby power is lower than standby power of the operation ready state;
calculate a predicted time period required for the electronic device to transit to the low power state;
select, from a plurality of device diagnoses, a particular device diagnosis whose execution is completed within the calculated predicted time period; and
execute the selected particular device diagnosis,
wherein the circuitry selects the particular device diagnosis based on an estimated device diagnosis time, the estimated device diagnosis time is a time period estimated for each device diagnosis of the plurality of device diagnoses from a start of an execution of the each device diagnosis to a completion of the execution of the each device diagnosis.

2. An electronic device comprising circuitry configured to:
control a state transition between an operation ready state and a low power state, the low power state being a state whose standby power is lower than standby power of the operation ready state;
calculate a predicted time period required for the electronic device to transit to the low power state;
select, from a plurality of device diagnoses, a particular device diagnosis whose execution is completed within the calculated predicted time period; and
execute the selected particular device diagnosis,
wherein the circuitry selects the particular device diagnosis based on one of the operation ready state and the low power state, the one of the operation ready state and the low power state being set for each device diagnosis of the plurality of device diagnoses as a state in which the each device diagnosis is executable.

3. The electronic device of claim 1, wherein
the circuitry selects the particular device diagnosis to be executed from among one or more device diagnoses whose execution are completed within the predicted time period from the plurality of device diagnoses, based on importance and an execution history, the importance and the execution history being set for each device diagnosis of the plurality of device diagnoses.

4. An electronic device comprising circuitry configured to:
control a state transition between an operation ready state and a low power state, the low power state being a state whose standby power is lower than standby power of the operation ready state;
calculate a predicted time period required for the electronic device to transit to the low power state;
select, from a plurality of device diagnoses, a particular device diagnosis whose execution is completed within the calculated predicted time period; and
execute the selected particular device diagnosis,
wherein the electronic device includes an image forming apparatus including a fixing device, and
the circuitry calculates the predicted time period based on a measured fixing temperature and a fixing temperature threshold value, the fixing temperature value being a condition for a transition to the low power state.

5. The electronic device of claim 4, wherein
the circuitry
acquires an outside air temperature, and
calculates the predicted time period based on the outside air temperature, the measured fixing temperature, and the fixing temperature threshold value.

* * * * *